Fig. 10 — Timing chart (Lead Making Machine)

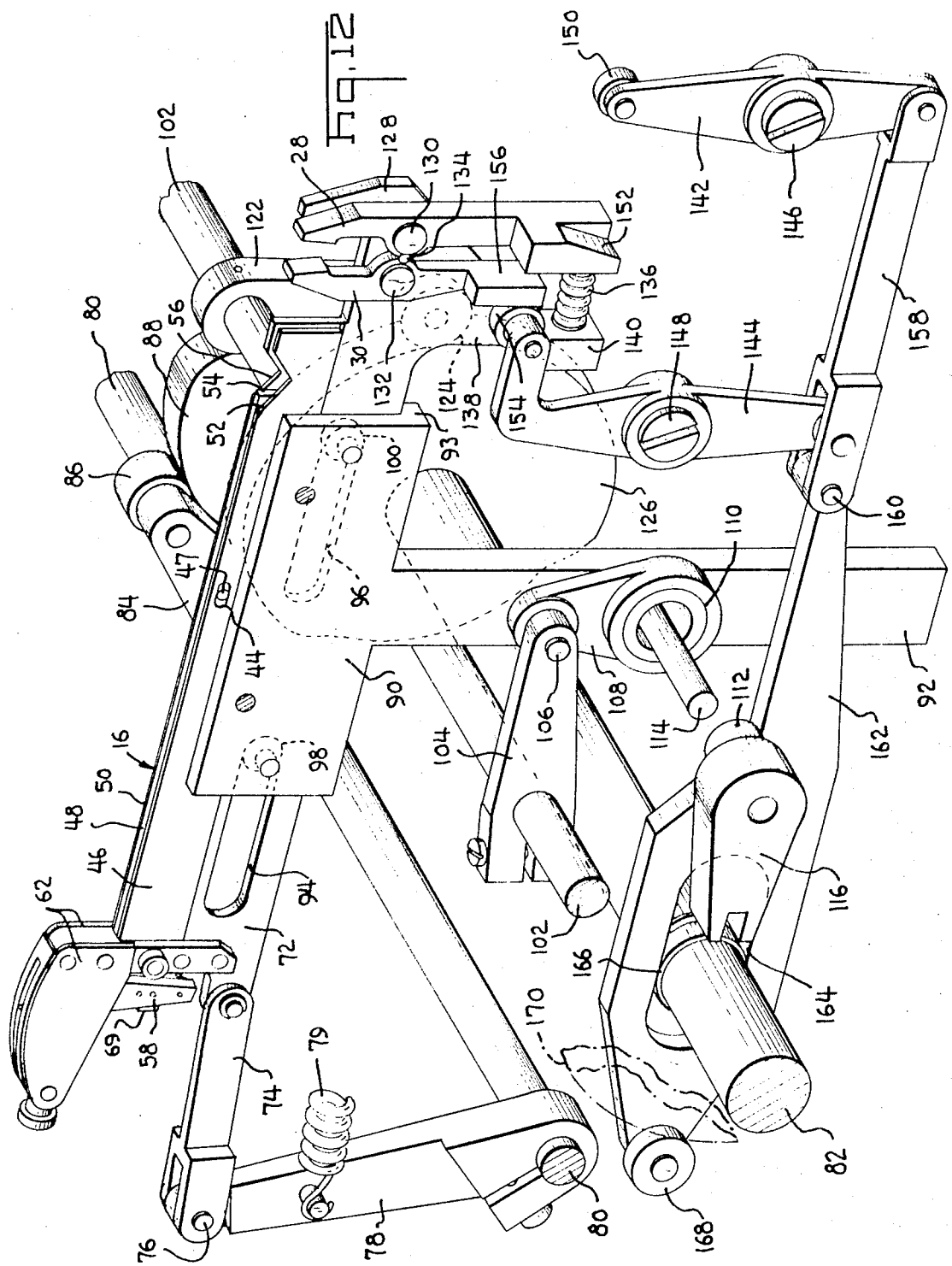

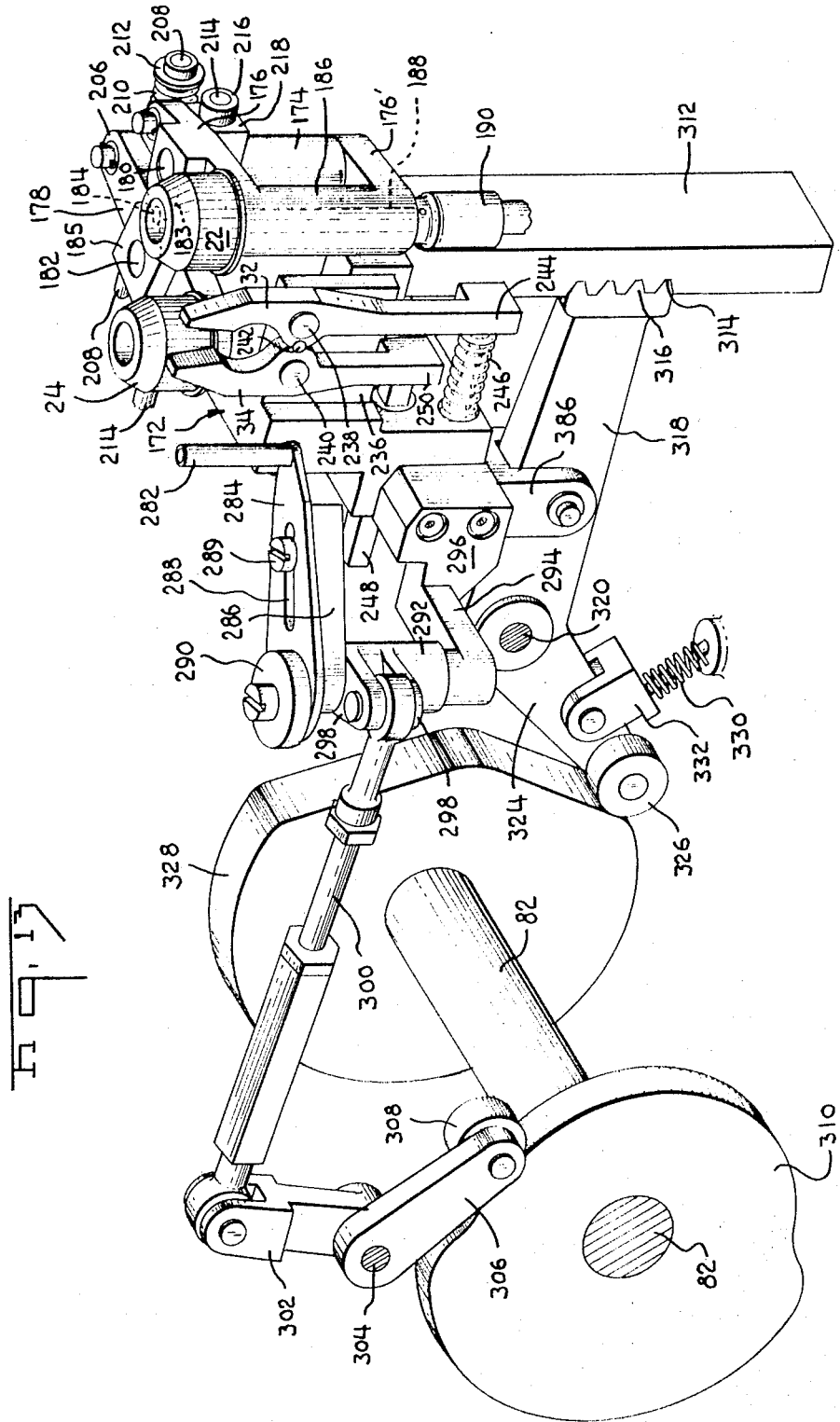

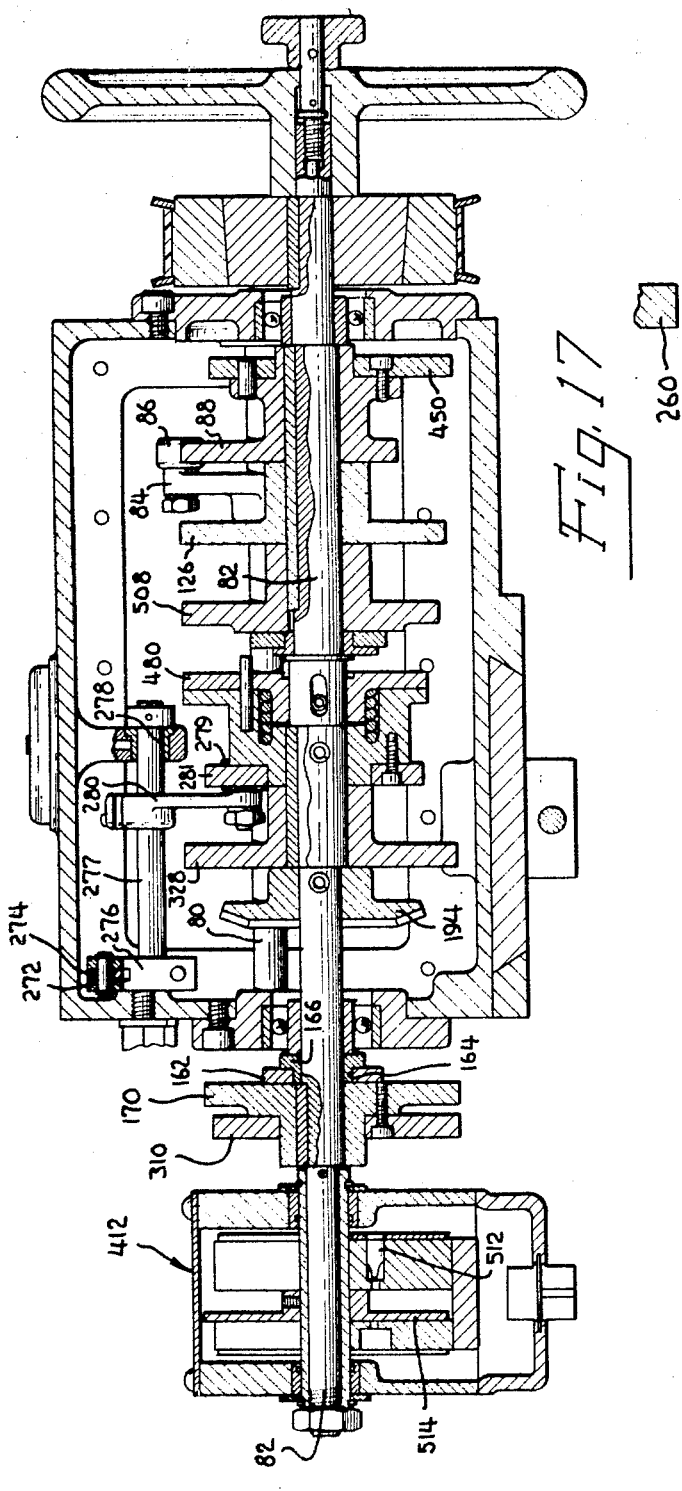

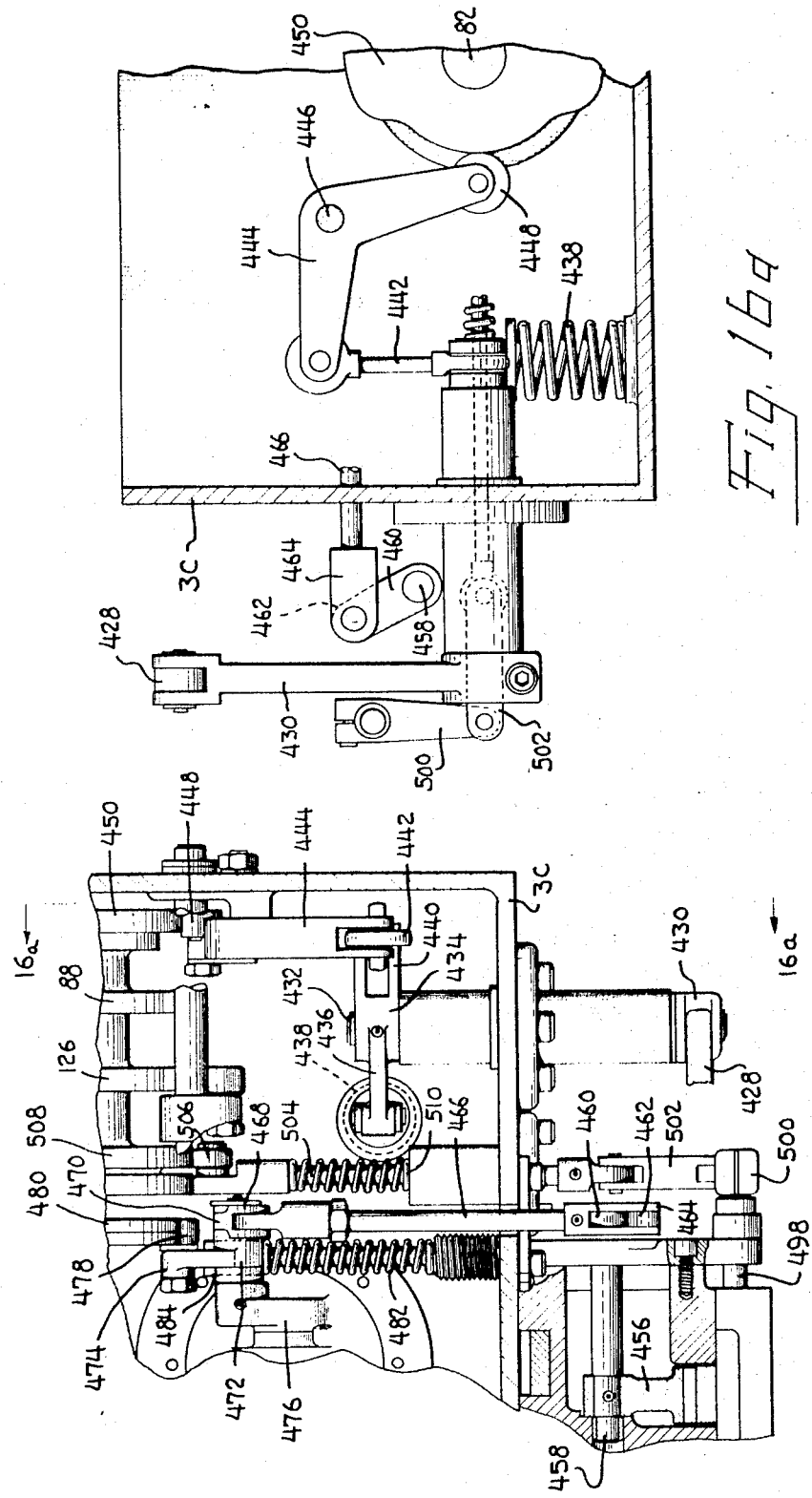

| Degrees of rotation of main power shaft 82 | 0 — 30 | 30 — 60 | 60 — 90 | 90 — 120 | 120 — 150 | 150 — 180 | 180 — 210 | 210 — 240 | 240 — 270 | 270 — 300 | 300 — 330 | 330 — 360 |
|---|---|---|---|---|---|---|---|---|---|---|---|---|
| Position of conveyer bar 16 (A see note, B, C, D) | Moves from A to B | | Dwell at B | | | Moves from B to C | Moves from C to D | Dwell at D | Moves from D to A | Dwell at A | | |
| Jaws 28, 30 | Closed | | | | Opened by lever 142 | | | | Opened by lever 144 | | | Closed; Lowered by cam 328 |
| Gauging assembly support block 172 | Dwell in down position | Raised by cam 328 | | Dwell in up position | | | | | | | | Dwell open |
| Jaws 32, 34 | Open | | | | | Closed during this interval when end of wire is detected by 408 | | Opened during this interval instant after jaws 32,34 close | | Opened by cam 281 | | |
| Rolls 22, 24 | Dwell open | | | Closed by spring 210 | | | | Remain open | | | | |
| Wire inserting slide 420 forward + back | Back | Dwell in back position | | | | | Moved forward | Dwell in forward pos. | Moving back | | | |
| Raise + lower | Down | Raised | | Dwell in up position | | | | | Lowered | Dwell in down pos. | | |
| Jaws 36, 38 on wire inserting slide | Opened by lever 494; Closed | Dwell open | Closed by spring 486 | | | | Dwell closed | | | | | |
| Crimping die + anvil | | | | Press ram descends to crimp terminal at 270° and is immediately raised | | | | | | Crimping | | |

NOTE: Letters A thru D denote position of notch 18 as viewed in FIG. 4

United States Patent Office 3,456,324
Patented July 22, 1969

3,456,324
LEAD MAKING MACHINE
Paul Turner Hahn, Harrisburg, and Penrose Robinson Hoopes, Philadelphia, Pa., and Gunnar Cramer Froelich, deceased, late of Philadelphia, Pa., by Henrietta C. Hale, executrix, Holliston, Mass., assignors to AMP Incorporated, Harrisburg, Pa.
Filed Oct. 10, 1966, Ser. No. 587,371
Int. Cl. H01r 9/00; B21d 43/02; B21j 13/08
U.S. Cl. 29—203        6 Claims

ABSTRACT OF THE DISCLOSURE

Machine for making electrical leads comprises conveyer, wire loading station, wire locating station, and terminal crimping station, these stations being positioned beside the path of movement of the conveyer. The conveyer is adapted to hold a wire intermediate its ends and carry it from the loading station to the locating station at which the wire is moved axially until its end is located at a precisely predetermined position with respect to the conveyer. Thereafter, the wire is carried by the conveyer to the crimping station and the wire end is precisely located in a crimping press by virtue of the axial movement of the wire at the locating station.

BACKGROUND OF THE INVENTION

This invention relates to automatic machines for attaching electrical terminals to the ends of lead wires.

An object of the invention is to provide an improved electrical lead making machine. A further object is to provide a machine capable of attaching a wide variety of types of terminals to wire ends. A still further object is to provide a compact machine which will perform the operations normally performed by a human operator of a non-automatic terminal applicator. A still further object is to provide an electrical lead making machine of the type having a conveyer which carries the leads laterally of their axes to a crimping zone, a machine in accordance with the instant invention having improved conveyer means and having improved means for positioning the ends of the leads relative to the conveyer so that the ends will be located precisely in a crimping press in the crimping zone.

These and other objects of the invention are achieved in a preferred embodiment thereof comprising a conveyer, a wire loading station, a wire locating or gauging station, and a wire crimping station disposed alongside the conveyer. The conveyer comprises a reciprocable conveyer bar having a notch therein in which a lead wire is located during each operating cycle. This lead wire is carried to the wire locating station at which it is moved axially relative to the conveyer bar until its end it located at a precisely predetermined distance from the conveyer bar. The wire is then transferred by means of a pair of clamps on the conveyer bar to the wire locating station at which it is gripped by a slide member movable normally of the path of movement of the conveyer and towards a crimping press. The electrical terminal is crimped onto the wire end after it has been delivered to the crimping press at the crimping station. A significant feature of a machine in accordance with the invention is that after the wire end has been precisely located at a predetermined distance from the conveyer at the wire locating station, extremely careful and close control of the wire is maintained by the transferring clamps on the conveyer bar which grip the wire and transfer it to the crimping station. As a result, the wire is always positioned precisely in the terminal in the crimping press and a relatively high production rate can be achieved and maintained.

Figure 5:
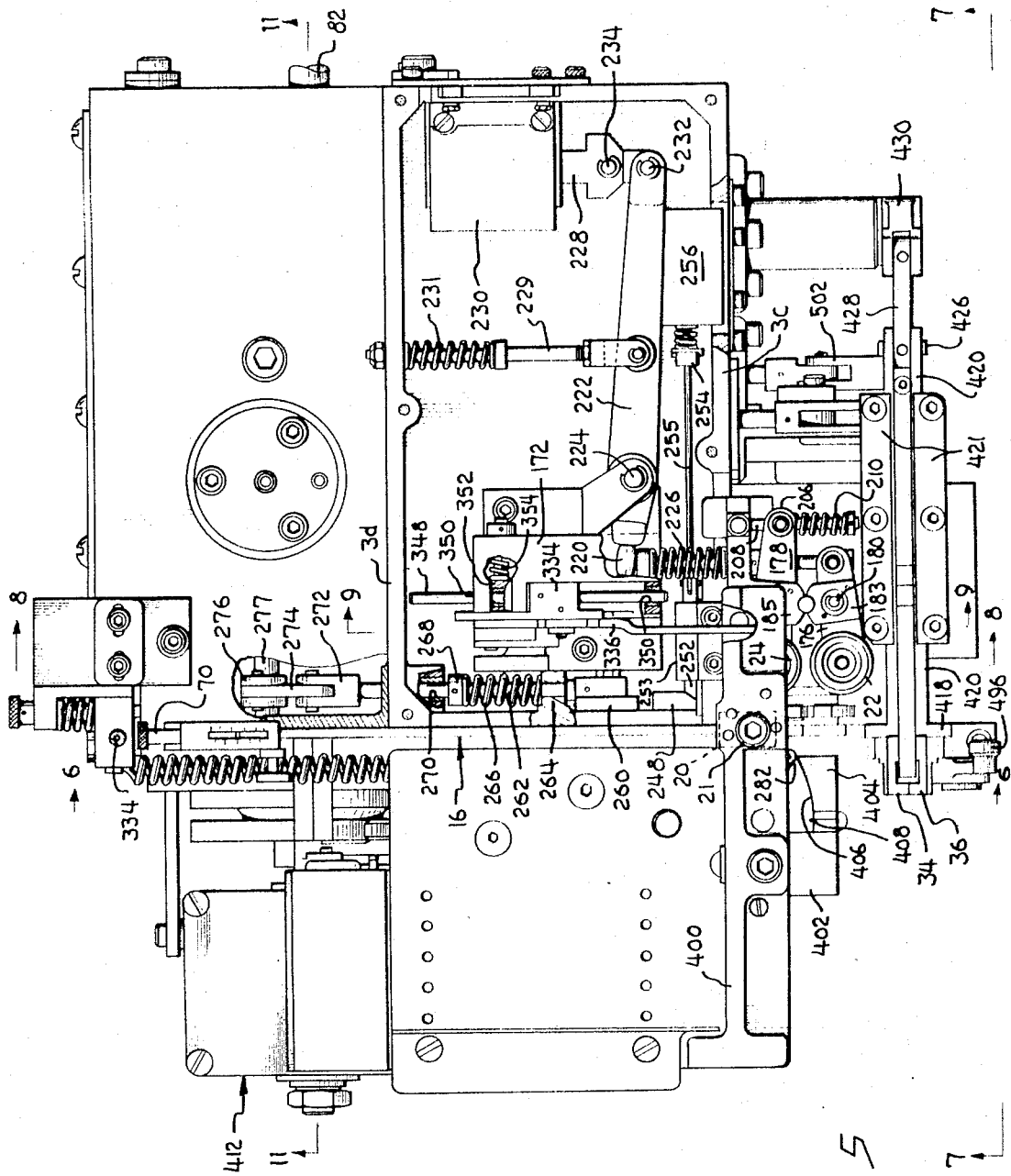
FIGURE 5 is a plan view with parts broken away in the interest of clarity of the operating zone of the embodiment of FIGURE 4 and showing the conveyer bar, the wire pulling rolls at the wire pulling station, and the wire inserting slide at the crimping station.
Figure 8:
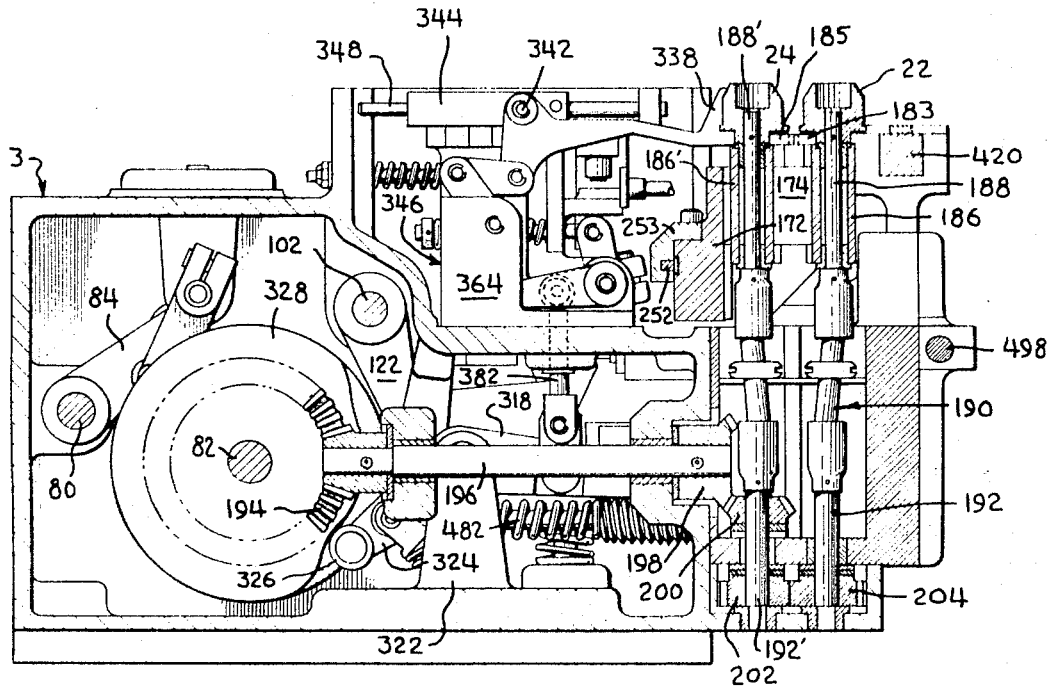
Figure 9:
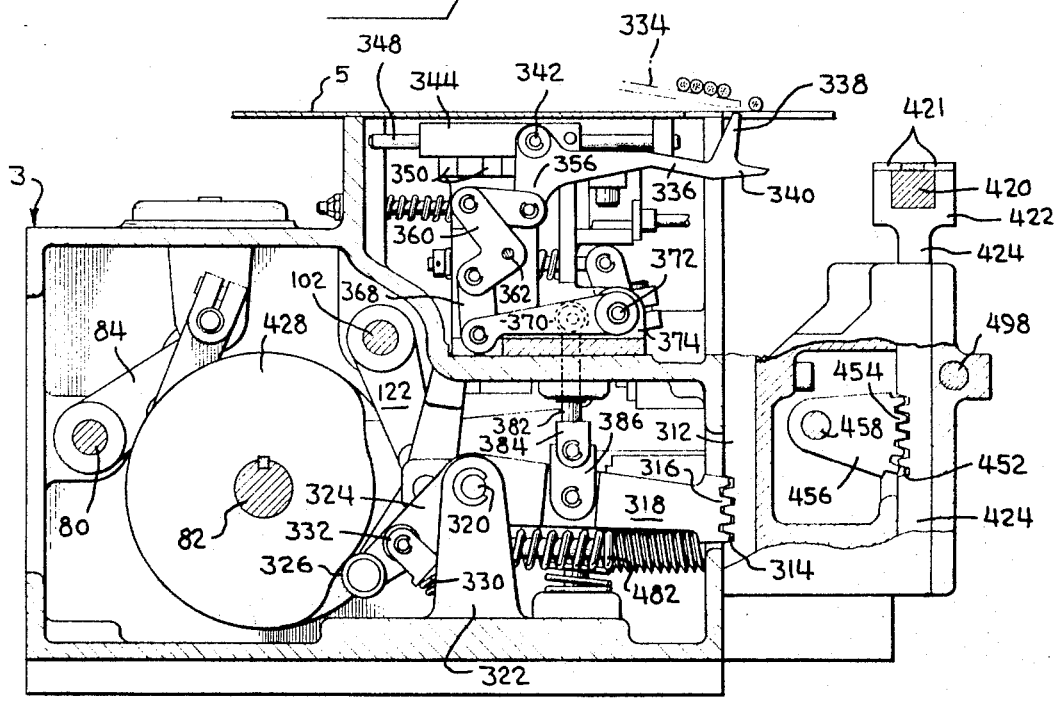
Figure 10:
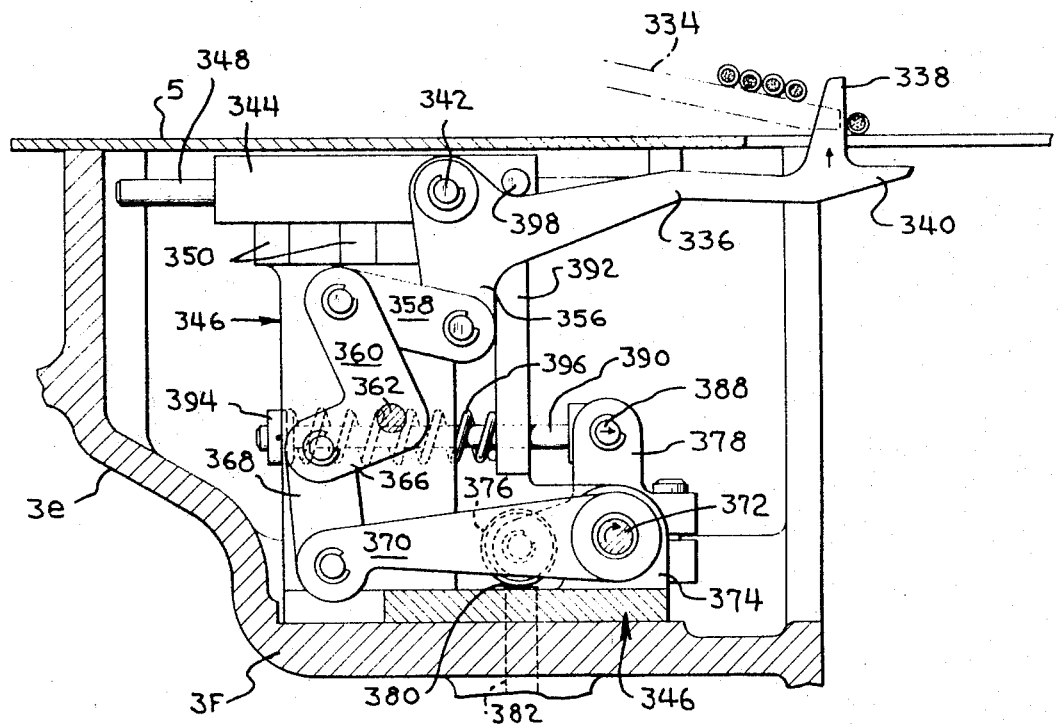
Figure 11:
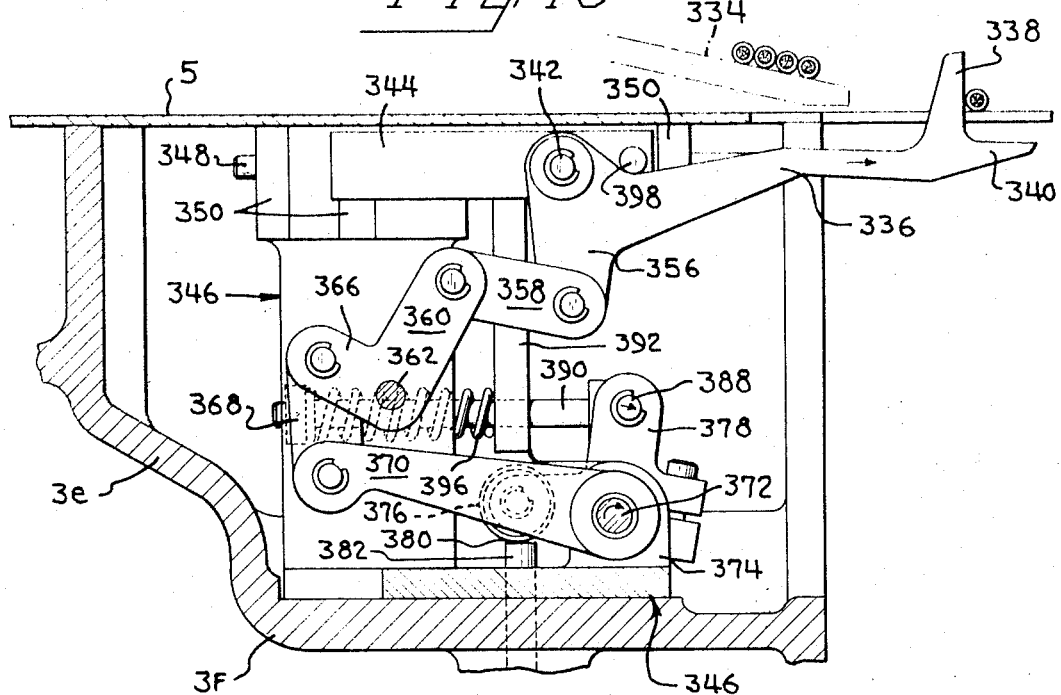

FIGURES 6, 7, 8, and 9 are views taken along the lines 6—6, 7—7, 8—8, and 9—9 of FIGURE 5;

FIGURE 10 is a view on an enlarged scale of a wire pushing mechanism which appears in the central upper portion of FIGURE 8;

FIGURE 11 is a view similar to FIGURE 10 but showing the positions of the parts after the wire pushing operation has been completed;

FIGURE 12 is a fragmentary perspective view of the conveyer mechanism by means of which the wires are transported from the wire loading station to the wire locating station then to the crimping station and showing the manner in which this conveyer mechanism is driven by the main power shaft;

FIGURE 13 is a fragmentary perspective view showing the wire pulling rolls at the wire locating station and the manner in which they are driven by the main power shaft;

FIGURE 14 is a view taken along the lines 14—14 of FIGURE 13 and illustrating part of the actuating mechanism for the wire pulling rolls;

FIGURE 15 is a fragmentary plan view showing the mechanism for opening the wire pulling rolls at one stage of the operating cycle;

FIGURE 16 is a fragmentary sectional plan view of the actuating mechanism for the wire inserting slide and the wire crimping jaws mounted thereon;

FIGURE 16a is a view taken along the lines 16—16 of FIGURE 10 and showing a portion of the actuating mechanism for the inserting slide by means of which the wire is positioned in the crimping press;

FIGURE 17 is a view taken along the lines 17—17 of FIGURE 5 showing the main power shaft and the actuating cams thereon; and FIGURE 18 is a timing diagram which sets forth the sequence of operation of the disclosed embodiment.

Figure 4:
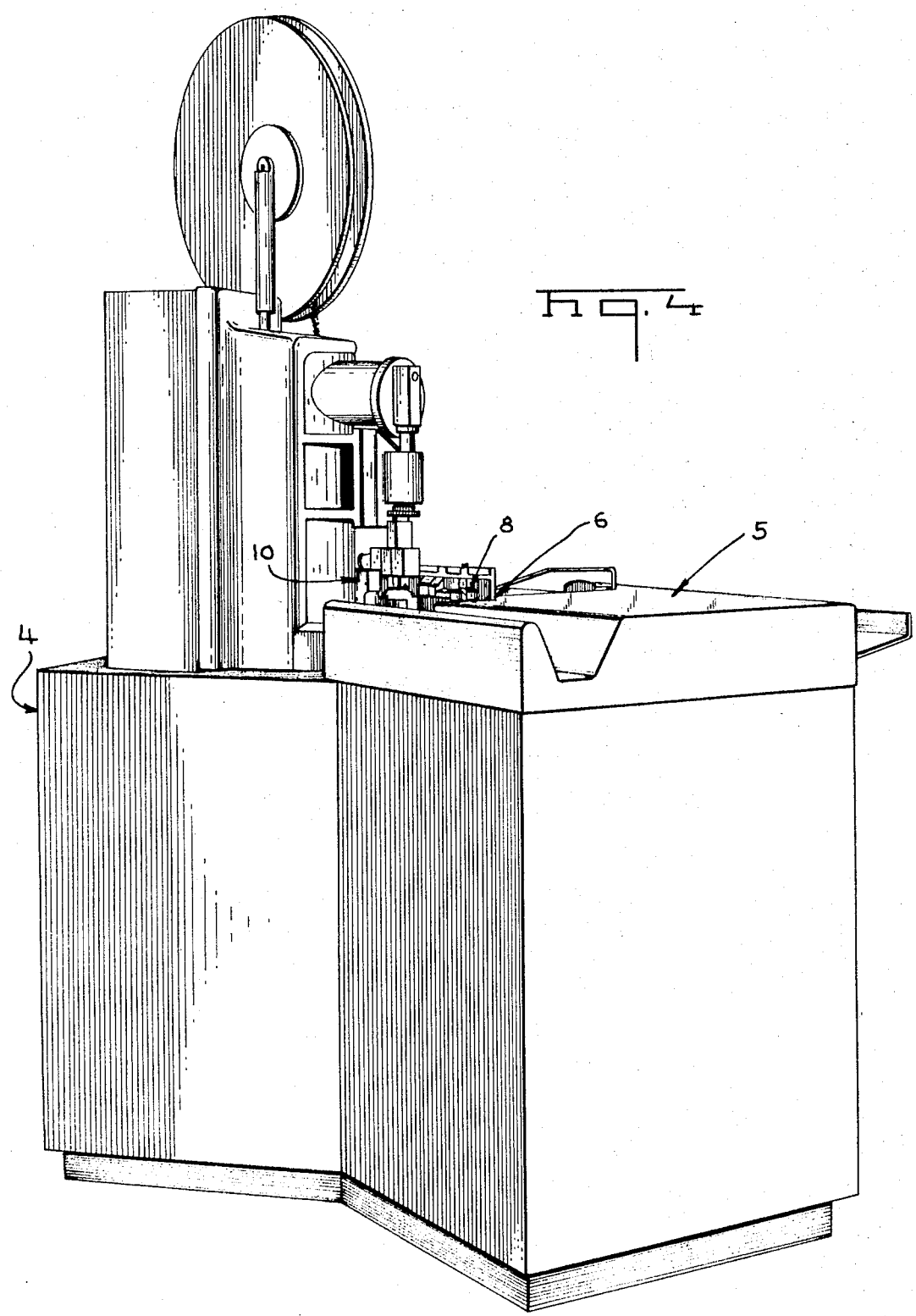
FIGURE 4 is a pictorial perspective view of a preferred form of apparatus in accordance with the invention.

Referring first to FIGURE 4, a lead making machine 2 in accordance with the invention comprises a table or support 4 having on one side of its upper surface 5 a conveyor structure generally indicated at 6. A lead wire is conveyed by the conveyor laterally of its axis to a gauging station 8 thence to a wire inserting station and crimping press indicated at 10. The wire is pulled at the gauging station 8 by pulling rolls until its stripped end is located at a predetermined distance from the conveyer such that the stripped end will be delivered to the wire inserting means at the crimping station. A terminal is then crimped onto the wire at the crimping station. As will become apparent as this description proceeds, the instant machine is of the general type disclosed and claimed in U.S. Patent No. 3,204,334, by Robert A. Long et al., issued Sept. 7, 1965, for Lead-Making Method and Apparatus.

Figure 1:
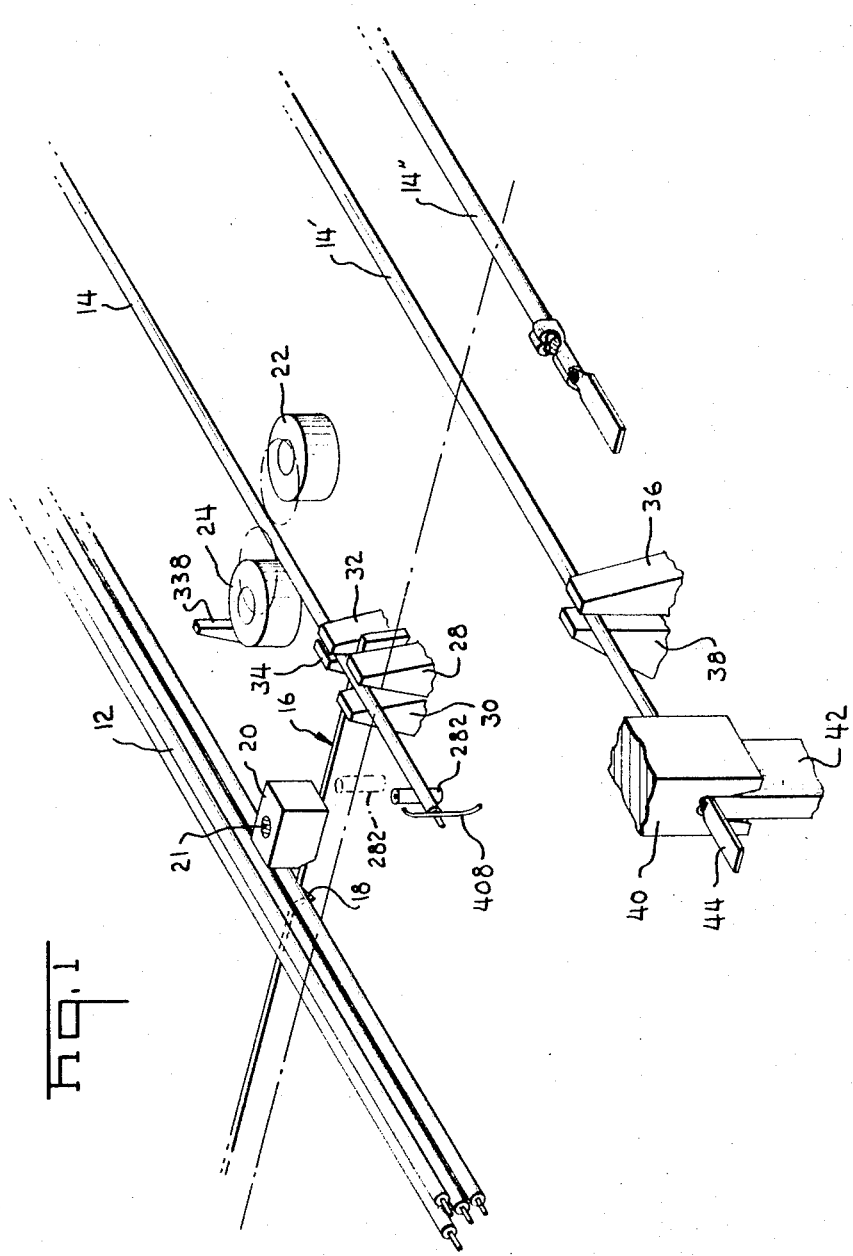
FIGURE 1 is a perspective schematic view showing some of the more important elements of a mahcine in accordance with the invention and illustrating the manner in which the individual wires are carried from a loading station, a wire locating station, and to a wire crimping station.
Figure 2:
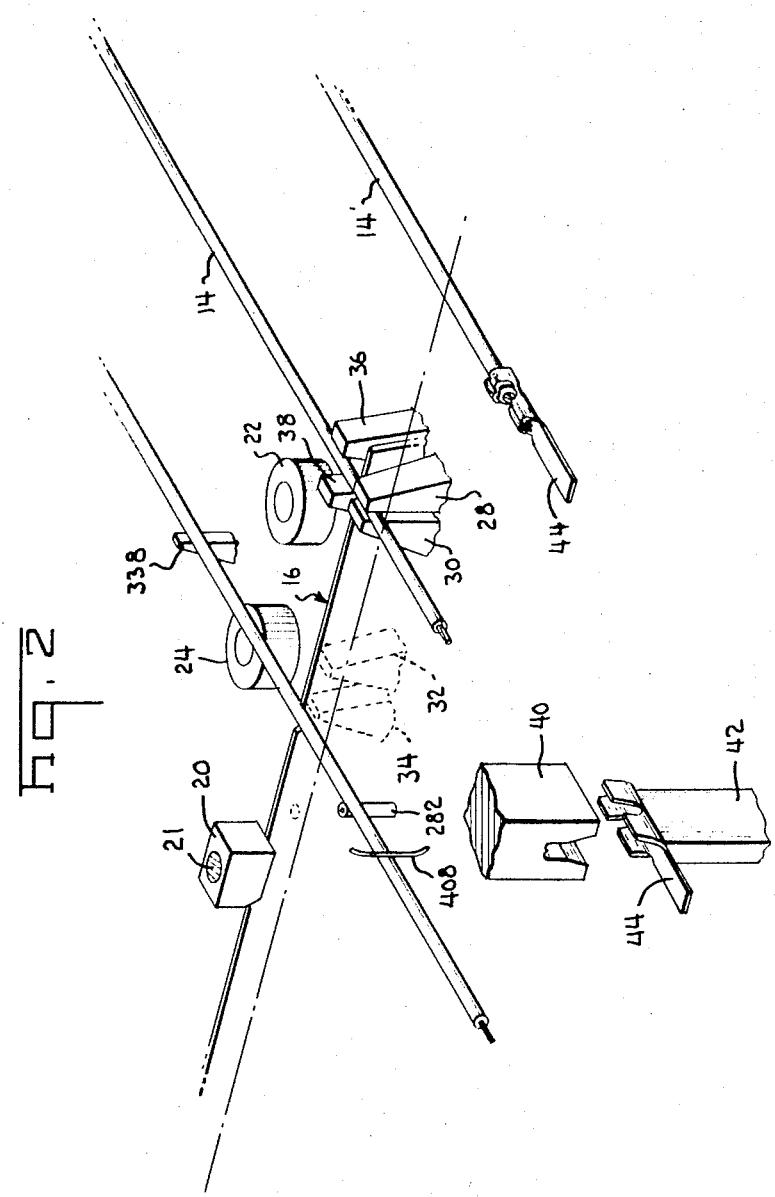
FIGURES 2 and 3 are views similar to FIGURE 1 but showing the positions of the parts at various times during a complete operating cycle.
Figure 3:
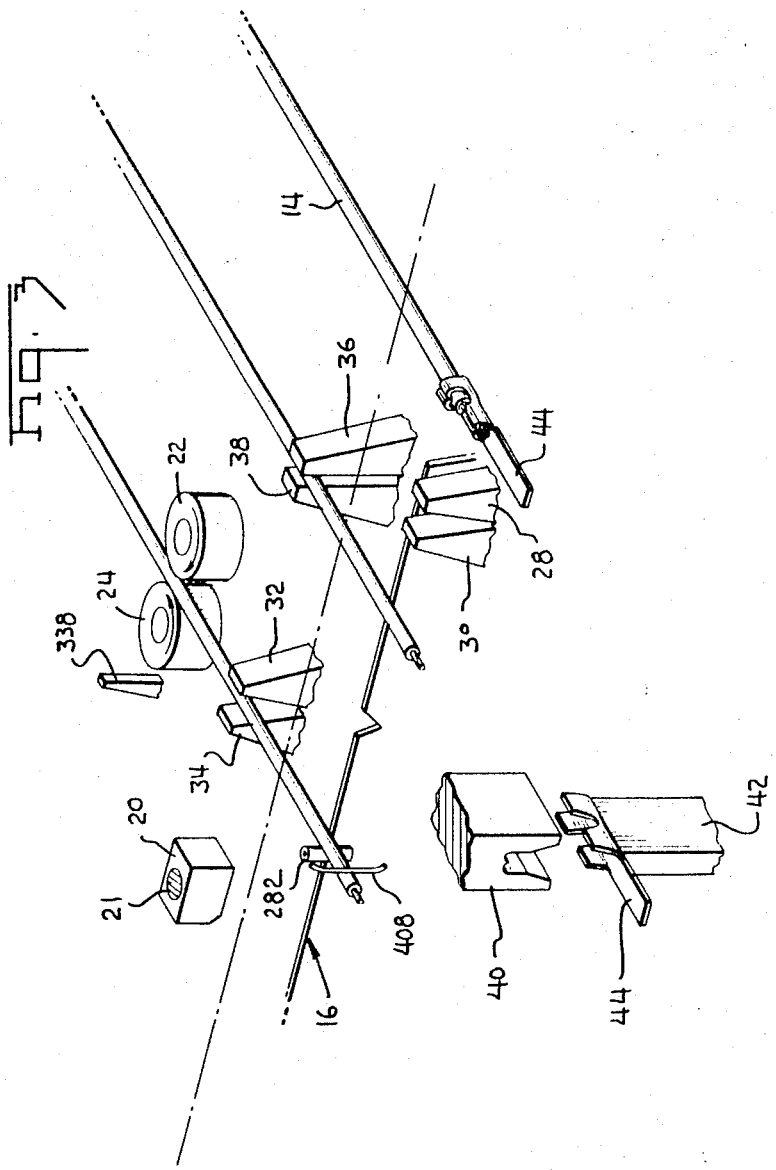

FIGURES 1–3 show fragmentarily the essential structural elements of a machine in accordance with the invention and illustrating the principles of operation. A bundle 12 of lead wires is placed on a conveyer bar generally indicated at 16 which is movable rightwardly from the position of FIGURE 1 to the position of FIGURE 2 and is then lowered to the position of FIGURE 3 during the operating cycle. This bar then moves leftwardly and upwardly and thereby returns to the position shown in FIGURE 1. Conveyer bar 16 has a notch 18 intermediate its ends into which an individual one of the wires 14 falls at the beginning of the operating cycle. As the conveyer bar moves rightwardly from the position of FIGURE 1 to the position of FIGURE 2, it passes beneath an abutment 20 which prevents additional lead wires from being carried towards the pulling mechanism and the crimping press. The wire removed from the bundle and carried rightwardly by the notch 18 of the conveyer bar is delivered to the gauging station at which the pulling rolls 22, 24 engage the wire and pull it rightwardly until its stripped end moves against a sensing element wire 408. This sensing wire is located at the required distance from the plane of the conveyer so that the lead wire will be properly positioned or gauged relative to the plane of the conveyer for the subsequent operations. FIGURE 3 shows the roll in engagement with the wire at a point in time near the end of the pulling operation. After the wire has been pulled and gauged properly, a pair of jaws 32, 34 grip the wire at the pulling station and hold it firmly and the rolls move away from each other as shown in FIGure 1. Thereafter, an additional pair of jaws 28, 30 which are mounted on, and movable with, the conveyer bar 16 grip the wire and the jaws 32, 34 release their grip on the wire. During the next cycle of operation and while the conveyer bar moves rightwardly from the position of FIGURE 1 to the position of FIGURE 2, the gauged wire 14 is carried to a location at which it is in alignment with a pair of inserting jaws 36, 38. The jaws 28, 30 release their grip on the wire concomitantly with closure of the jaws 36, 38. When the conveyer bar 16 moves downwardly (FIGURE 3) and leftwardly (FIGURE 4), the jaws 36, 38 move inwardly and downwardly and locate the wire on an uncrimped terminal 44 supported on a crimping anvil 42. The crimping die 40 then moves downwardly and crimps the terminal onto the wire. A completed crimp connection 14″ is shown in FIGURE 1 after ejection from the machine.

It will be apparent from the foregoing description that during each operating cycle and from the timing diagram (FIGURE 18), one wire will be located for a brief interval at the gauging station and one wire will be located at the crimping station while the conveyer bar is moving from the position shown in FIGURE 2 to the position of FIGURE 3 then back to the position of FIGURE 1. This arrangement is advantageous in that the wires can be pulled or gauged at the pulling station and crimped at the crimping station while the conveyer is returning to its starting positon. In other words, the conveyer need not pause while the gauging operation and the crimping operation are being carried out. As a result, a relatively high production rate can be achieved although adequate time is provided at the gauging and crimping station to carry out the operations performed at these stations.

FIGURES 1–3 also illustrate fragmentarily an auxiliary wire pushing finger 338, which assists in pushing the wire from the bundle towards the gauging station, and a wire straightening post 282 which functions to press the wire against the sensing wire 408. These elements, along with the other elements not shown in FIGURES 1–3, are described in detail below and the manner of their operation is fully explained.

The various components such as the conveyer bar, the pulling rolls, and the inserting jaws of the machine are contained in or mounted on a housing casting generally indicated at 3. The various internal and external walls of this casting are identified as 3a, 3b, 3c, etc. The table surface 5 is provided above this casting housing 3 which supports the bundle of leads.

CONVEYER BAR

Figure 6:
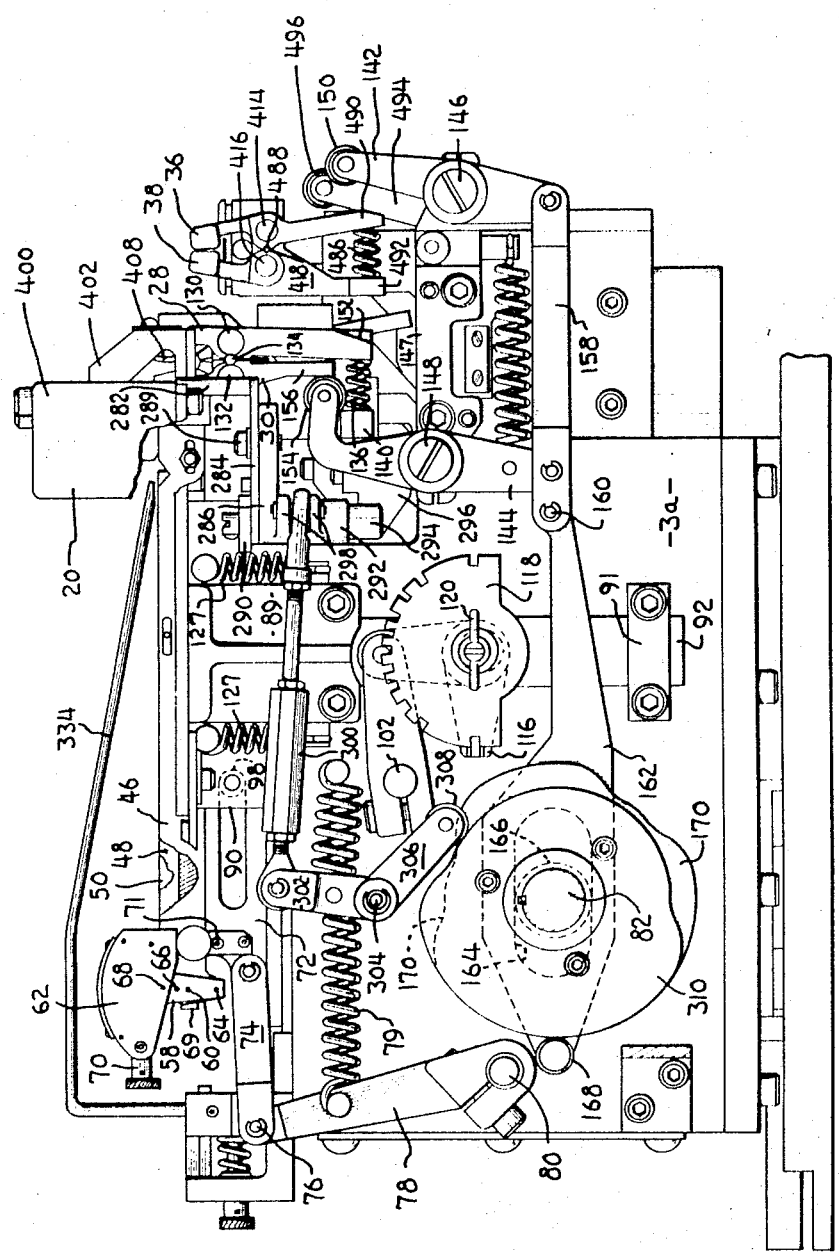

Referring now to FIGURES 5, 6, and 12, the conveyer bar 16 comprises a composite assembly made up of three individual bars 46, 48, and 50, the bars 46 and 50 being substantially similar to each other and the bar 50 being relatively thicker than the outer bars 46, 48. The bars 46, 50 thus have identical V-shaped notches 52, 56 while the bar 48 has a notch 54 having one vertically extending side. These three notches in the three bars thus define a composite notch, the size of which will be dependent upon the relative position of the center bar with respect to the outer bars 46, 50 and the positions of the bars 46, 50 with respect to each other. A pin 47 mounted in the center bar 48 extends into elongated slots 49 in the bars 46, 50 to permit these bars to move relative to each other along a straight line path for adjustment purposes as described below.

In order to permit use of the machine with wires having varying diameters, provision is made to adjust the positions of these bars relative to each other thereby to change the size of the notch. This adjustment is achieved by means of an adjusting lever 58 which is contained between, and which extends downwardly between, a pair of housing plate 62. Plates 62 are secured to a conveyor bar support member by means of a yoke 71 to which they are secured. The adjusting lever 58 is connected by pins 64, 66, and 68 to each of the three bars 46, 48, and 50 respectively. The adjusting lever 58 is also pivoted intermediate its ends independently to the three conveyor bars at 60 to an extension 69 of a conveyor bar support member 72. An adjusting screw 70 extends between the plates 62 and is threaded through the upper end of the lever so that upon turning this screw, the adjusting lever is swung relative to its pivotal axis 60 thereby to move the three pin connections 64, 66, and 68 along arcuate paths about the pivot point 60. This movement of the adjusting lever has the effect of moving the notch bars relative to each other thereby to make the composite notch in the conveyor bar larger or smaller. Specifically, the bars 46, 50 move in opposite directions and the center bar 48 moves in the direction of the bar 50 although the center bar is moved a lesser distance than the bar 50. With this arrangement, the location of the center of the notch does not change when the size of the notch is changed. It will be understood that the pin connections 64, 66, and 68 must be somewhat loose in order to permit the bars 46, 48, 50 to move along a straight line path while the adjusting lever swings about its pivotal axis 60. Advantageously, an indicating scale is mounted on the upper edges of the plates 62 to indicate the position of this lever, and, therefore, the size of the notch.

The conveyor bar assembly 16 is secured to, and supported by, an elongated conveyor support 72 which extends beneath the conveyor bar and laterally beyond the right hand end thereof as viewed in FIGURE 12. This conveyor support constitutes part of the conveyor means and carries the wire gripping jaws 28, 30 as described below. The horizontal motion of the conveyor bar (the leftward and rightward movement as viewed in FIGURES 1, 6, and 12) is achieved by means of a link 74 pivoted to the conveyor bar support 72 at one end and pivoted at its other end to an arm 78. This arm 78 extends from, and is secured to, an oscillating shaft 80 which extends between two opposite walls of the housing casting. The oscillating shaft 80 has an additional arm 84 secured thereto on which a cam follower 86 is mounted. This follower bears against a cam 88 on the main power shaft 82. A spring 79 has one end anchored on the arm 78 and has its other end anchored on the housing casting wall 3a as shown in FIGURE 6. The arm 78 is thus biased rightwardly in FIGURE 6 and swung leftwardly during each operating cycle against the force of the spring 79 by the cam 88. The connecting link 74 between the arm 78 and the conveyer bar support 72 permits vertical reciprocation of the conveyor bar and conveyor bar support 72 during the operating cycle by a mechanism which is described immediately below.

The underside of the conveyor bar support 72 is slidably supported on the ledge 93 portion of a T-shaped cradle having a head 90 and a depending arm 92. This arm is held against and guided on, the surface 3a of the casting housing by suitable guide brackets 89, 91. Elongated slots 94, 96 are provided in the support member 72 and rollers 98, 100 journalled in the head portion 90 of the cradle are received in these slots. The conveyor assembly, comprising the support 72 and the conveyor bar assembly 16 are thus permitted to move horizontally while the cradle member 90, 92 reciprocates vertically.

The vertical reciprocation of this cradle member is achieved by an oscillating shaft 102 suitably journalled in the casting housing 3 and having an arm 104 secured thereto which is pivotally connected at 106 to an arm 108 extending from a bearing 110. A bushing 112 is received in the bearing 110 and is eccentrically mounted on a pin 114 extending from the cradle portion 92. An adjusting arm 116 which is integral with the bushing 112 can be swung to any desired position and clamped in position against a plate 118 by a lock nut 120 threaded onto the pin 114. This arrangement permits adjustment of the upper and lower limits of the vertical movement of the cradle member and the conveyer assembly 16, 72.

The shaft 102 is oscillated by an arm 122 on the end of which there is provided a cam follower 124 in engagement with a cam 126 mounted on the main power shaft 82. It will thus be apparent that during continuous rotation of the main power shaft, the cradle and its depending arm 92 will be vertically reciprocated by the oscillating shaft 102 acting through the arm 104 and the arm 108 of the eccentric 110. The cradle 90 is biased downwardly by means of springs 127 which have their ends anchored to the housing casting and to the cradle itself. These springs assure rapid response of the parts and hold the cam follower 124 against the cam 126.

The previously identified wire gripping jaws 28, 30, which carry the wire from the wire gauging station to the wire inserting and crimping station, are mounted on spaced-apart pivotal axes 130, 132 on the right hand end 128 of the conveyor bar support member 72. In the vicinity of these pivotal axes, these jaw members have semi-circular enlarged portions which almost abut each other. A pin 134 fits into semi-circular recesses in these enlarged portions of the jaw members so that when the bottom portion of either of the jaw members is swung relative to its pivotal axis, both jaws will move relatively towards or away from each other. This action results from the fact that when either jaw member is swung about its pivotal axis, the pin 134 will be forced to move vertically and swing the other jaw member in the opposite direction. As will be explained below, this feature is used in other sets of jaws in the machine and in the pulling rolls. The jaws 28, 30 are resiliently biased to their closed position by means of a spring 136 which bears at one end against an integral boss 140 on a depending portion 138 of the conveyor support member and which bears at its other end against an enlarged portion of the lower end of jaw 28. In FIGURE 12, the jaws 28, 30 are shown as being held open against the biasing force of spring 136 by a control lever 144 which is described below.

The jaws 28, 30 are opened while the conveyor bar assembly dwells at the rightward limit of its travel by means of a lever 142 pivoted intermediate its ends at 146 to a bracket 147 on the casting housing. The lever 142 has a roller 150 on its upper end which cooperates with an inclined camming surface 152 on the lower end of the jaws 28. The lower end of the lever 142 is pivotally connected to a connecting rod 158 described below. The jaws 28, 30 are opened when the conveyer bar is in the position of FIGURE 12 by a similar lever 144 pivoted at 148 to bracket 147 and having a lateral extension on its upper portion on which a roller 154 is mounted. This roller is adapted to bear against an enlarged boss 156 on the lower end of the jaw 30. As clearly shown in FIGURE 12, the jaw 30 is somewhat shorter than the jaw 28 to permit this arrangement of the parts. The lower end of the lever 144 is pivotally connected to the previously identified connecting rod 158, the operation of which will now be described.

The connecting rod 158 is pivotally connected at 160 to a reciprocable slide member 162 having an elongated slot 164 intermediate its ends through which the main power shaft passes. Advantageously, a bearing 166 is mounted on the main power shaft to facilitate the sliding movement of this slide member 162 relative to the shaft. The portion of the slide 162 which extends leftwardly in FIGURE 12 beyond the main power shaft has a roller 168 mounted thereon which bears against a cam 170 shown fragmentarily in FIGURE 12 and mounted on the power shaft 82. The contour of this cam 170 (see FIGURE 6) is such that the lever 142 will function to open the jaws 28, 30 after movement of the conveyer bar from the position of FIGURE 1 to the position of FIGURE 2, and the lever 144 will be swung about its pivotal axis to permit the jaws to close under the influence of spring 136 when the conveyer bar is in the position of FIGURE 12 and after the individual wire at the gauging or pulling station has been pulled the desired amount by the rolls. The timing diagram (FIGURE 18) sets forth the sequence of opening and closing of these jaws.

THE WIRE GAUGING STATION

Referring now to FIGURES 5, 8, and 13, the gauging station comprises a pair of wire pulling rolls 22, 24, a pair of wire gripping jaws 32, 34, and the wire straightening member 282 which ensures that the stripped end of the wire will contact the sensing wire 408. All of these structural elements are mounted on a block 172 which is movable between a raised and a lowered position. As shown by the timing diagram, FIGURE 18, this block is in its raised position while a wire is being gauged and is lowered during the portion of the cycle during which a wire is being carried by the conveyer bar from the bundle to the gauging station.

The rollers 22, 24 are mounted on a vertically movable block 172 having a laterally extending flange 174. The roll 22 has an integral shaft 188 which extends through a cylindrical bearing member 186 from which arm 176 extends rearwardly and rightwardly as viewed in FIGURE 13. The roller 24 has a similar integral shaft 188' disposed in a bearing member 186' from which there extends a similar arm 178, the arm 178 extending rearwardly at a greater distance than the arm 176 as best shown in FIGURE 5. The arms 176, 178 are mounted on pivot pins 180, 182 which extend into the flange 174 identified above. Adjacent to their pivotal axes, these arms have bearing blocks 183, 185 extending towards each other and between which there is mounted a pin 184. This pin is received in semi-circular recesses in the bearing blocks so that when either of the two arms 176, 178 is swung about its pivotal axis, both of the arms, and therefore the rolls, will move relatively towards and away from each other. The arrangement is substantially similar to the arrangmeent described above for opening or closing the jaws 28, 30.

The shaft 188, 188' on which the rolls are mounted and which extend downwardly through the bearings 186, 186' are coupled as shown at 190 to shafts 192, 192' disposed in the lower portion of the casting housing. The couplings 190 may be of any suitable commercial type but should be capable of permitting downward movement of the rollers relative to the shafts 192, 192' and should be capable of undergoing limited lateral movement towards and away from each other in order to accommodate the opening and closing of the rollers. Essentially, these couplings comprise splined couplings combined with laterally movable shafts and are commercially available. For example, couplings of this type provided by Falcon Machine and Tool Company of North Wilmington, Mass., have been used with success.

The rolls are driven by bevel gears indicated generally at 194, the larger bevel gear being mounted on the main power shaft 82. The smaller bevel gear is pinned to a shaft 196, which has suitable bearings in the casting housing portion 3b and which extends towards the shafts 192, 192'. On the end of the shaft 196 there is provided a burl gear 198 which in turn meshes with a bevel gear 200 secured to the shaft 192'. The shaft 192' and therefore the roll 24 is directly driven by the shaft 196. Power is transmitted from the shaft 192' to the shaft 192 by means of gears 202, 204 mounted on the lower ends of these shafts and suitably journalled in the lower portions of the casting housing.

The opening and closing of the rolls is achieved in general by means of springs in order to ensure positive and rapid operation of the parts during the relatively short operating cycle of the machine. The opening and closing mechanism for the rolls will now be described.

A control rod 208 extends laterally through bearing block 209 in a rearward extension 206 of the arm 178 and is mounted for limited pivotal movement on the block 172. Bearing block 209 has an integral pin 211 which is rotatably mounted in extension 206 thereby to permit limited rotation of block 209. This control rod is provided with a suitable washer or keeper on its end and a spring 210 is interposed between this washer and the side of the rearward end 206 of the arm 178. Since the rod extends freely through the arm, this spring tends to bias the arm 178 in a counterclockwise direction with respect to its pivotal axis as viewed in FIGURE 5. The spring 210 thus functions to bias the forward (lefthand) ends of the arms towards each other as viewed in FIGURE 5 and therefore to bias the rolls to their closed condition. This spring is overcome, as described below to open the roll during the portions of the operating cycle indicated in FIGURE 18.

The rolls are opened by means of a control rod 214 disposed parallel to, and beside, the control rod 208. Rod 214 extends through housing wall 3c, and through a rotatably mounted bearing block 218 in the arm 78, as best shown in FIGURES 13 and 14. This control rod has an enlarged collar 216 on its end, and has an enlarged upper or inner end as viewed in FIGURE 5. A spring 226 acts against this upper end of the control rod and against the surface of the block 172 to bias this arm upwardly as viewed in this figure. The enlarged end of the control rod 214 abuts a roller 220 on the end of a lever 222 pivoted at 224 to a bracket extending from a housing 350 which is described below. Lever 222 has a pivotal connection 232 through a link 234 to the armature 228 of a solenoid 230. A return spring 231 bears against the collar on a return rod 229 which is pivoted to the lever 222 between its intermediate pivot 224 and the pivotal connection 232. This return spring thus biases the lever 222 in a clockwise direction as viewed in FIGURE 5.

The rolls 22, 24 are maintained in their open or separated conditions (FIGURE 5) by the action of the spring 226 bearing against the head of the control rod 214. It will be apparent that this spring 226 must be stronger than, and must overcome, the spring 210. To close the rolls, the solenoid 230 is energized thereby causing the armature 228 to move inwardly swinging the lever 222 in a counterclockwise direction about its pivotal axis 224. The roller 220 then pushes the head of the control rod 214 downwardly as viewed in FIGURE 5 and, in effect, bypasses the spring 226. The spring 210 thereafter functions to swing the arm 178 in a counterclockwise direction causing the forward ends of the arms 178, 176 and the rolls 22, 24 thereon to move towards each other and into engagement with a wire. As pointed out in the timing diagram, the rolls are, for much of the operating cycle, in their open position shown in FIGURE 5. These rolls are closed while the conveyer bar dwells in position B and remains closed until the wire is properly gauged.

The previously identified gauging station jaws 32, 34 are mounted on the block 172 in front of the rolls 22, 24 and between these rolls and the path of reciprocation of the conveyer bar. The function of these jaws is to tightly grip the wire and to hold it firmly until the transfer jaws 28, 30 on the conveyer bar grasp the wire and transfer it to the crimping station. The jaws 32, 34 close prior to opening of the rolls and, abruptly stop the movement of the wire through the rolls. The jaws 32, 34 thus constitute an important part of the gauging mechanism. These jaws 32, 34 move up and down with the rolls.

The jaws 32, 34 are mounted on spaced-apart parallel pivotal axes 238, 240 comprising pins which extend into, and are mounted in, an ear 236 forming part of the block 172. Like the jaws 28, 30, the jaws 32, 34 have enlarged intermediate portions adjacent to the pivotal axes 238, 240 between which a pin 242 is mounted. This pin is freely mounted in semi-circular recesses in the jaws so that if one jaw is closed or swung about its pivotal axis the other jaw will move similarly. Again, then the jaws can be opened and closed by pushing on the lower end of only one of the jaws.

The jaw 32 has a depending portion 244 which extends downwardly beyond the lower end of the jaw 34 and a spring 246 bears against an enlarged end of the depending portion and against a surface of the block 172 thereby to bias the jaw 32 in a counterclockwise direction as viewed in FIGURE 13, and, therefore, to bias the jaws towards their closed condition. The jaws are maintained in their opened condition during most of the operating cycle by means of a control rod 248 which extends slidably through the block 172 and which is held in engagement with an enlarged lower end portion 250 of the jaw 34. Referring to FIGURE 15, it can be seen that the control rod 248 is held in the position there shown by a detent means comprising a block 252 having a chisel-like end which is adapted to enter a correspondingly shaped notch on the side of the rod 248. The block 252 extends slidably through a suitable guide block 253 secured to the block 174 and is pivotally connected to a connecting rod 255 which, in turn, is pivotally connected to the armature of a solenoid 256. When this solenoid is energized, the link 255 and the rod 252 move rightwardly as viewed in FIGURE 5 thereby disengaging the detent mechanism 252 and permitting the jaws to close under the influence of the spring 246.

Substantially, simultaneously with closure of the jaws 28, 30, the jaws which are mounted on the conveyer bar, the jaws 32, 34 are opened to release the wire. The opening of the jaws 32, 34 is accomplished by a reciprocable block 260 on the end of a control rod 262 which has a bearing in a suitable ear 264 integral with the casting housing wall 3a. The control rod 262 is biased upwardly as viewed in FIGURE 5, that is, towards the main power shaft 82 by a spring 266 which bears against the ear 264 and against a collar 268 mounted on the rod. Control rod 262 extends through a suitable bearing 270 in housing wall 3d and has a clevis 272 on its end. This clevis is pivotally connected to a link 274 which, in turn, is pivotally connected to an arm 276 secured to and extending from a shaft 277 (see FIGURE 17). Shaft 277 is supported in a bearing 278 in the casting housing and has an arm 280 extending therefrom on which a cam follower 279 is mounted. This cam follower is in engagement with a cam 281 on the main power shaft.

From the foregoing description and from the timing diagram, it will be apparent that during most of the operating cycle, the control rod 248 is in the position shown in FIGURES 5 and 15, that is, in its latched condition so that it is effective to hold the jaws 32, 34 in their open condition against the compression of spring 246. To close the jaws 32, 34, the solenoid 256 is energized thereby permitting the spring 246 to push the control rod 248 upwardly in FIGURE 15 and close the jaws. The jaws are, of course, opened at a later time by an oscillation of the shaft 277 which is caused by the cam 281.

While a wire is being carried from the bundle 12 to the wire gauging station, the portion of the wire which extends leftwardly in FIGURE 1 of the conveyer bar must be straightened so that it will be in substantial alignment with the portion of the wire which extends rightwardly in FIGURE 1 and between the rolls. Furthermore, when the wire is at the wire gauging station, as is the case for the wire 14 in FIGURE 1, it must be held against the block 404 (described below) in which the wire sensing element 408 is mounted. The means for straightening the wire during its movement to the wire gauging station and for holding the wire against this wire sensing element 408 is mounted on and movable with the block 172 and it will, therefore, be described at this time.

The wire is straightened by an insulated upstanding post 282 which extends from the end of an arm 284 adjustably mounted by means of a slot 288 and a set screw 289 on an arm 286 which extends from and is integral with a cylindrical bearing boss 292. The adjustment of the position of the plate 284 with respect to the arm 286 is achieved by means of an eccentric 290. To adjust the location of the arm 282, it is thus merely necessary to loosen the screw 289 and turn the eccentric adjusting screw 290. When the proper position of adjustment is achieved, the set screw is, of course, tightened.

The bearing boss 292 is rotatably mounted on a spindle extending from an arm 294 integral with a block 296 which in turn is integral with the support block 172. The bearing boss 292 is oscillated during each cycle by means of a cam 310. Specifically, the boss 292 has a pair of spaced-apart ears 298 between which an adjustable connecting rod 300 is pivoted. The other end of this connecting rod is pivoted to one arm 302 of a bell crank pivotally mounted at 304 on a pin extending from the casting housing. The other arm 306 of this bell crank has a follower 308 on its end which is engaged by the cam 310 on the main power shaft 82. During each operating cycle, that is, during each complete rotation of the main power shaft 82, the link 300 is moved leftwardly in FIGURE 13 then rightwardly thereby to swing the arm 286 and therefore the plate 284 and post 282 through a slight clockwise arc as viewed in FIGURE 5. During its movement, it moves over a conforming arcuate surface 406 on the block 404 and comes to rest in the location shown in FIGURE 1 so that it guides the wire being pulled. As a result, the stripped end of the wire will move past and engage the sensing wire 408 thereby controlling the electrical circuitry of the gauging mechanism.

The block 174 is lowered during each operating cycle in order to move it out of the way of the wires being carried to and from the gauging station by the conveyer. Subsequently, it is raised immediately prior to pulling of the wire by the rolls as is described in the timing diagram. The mechanism for raising and lowering the block 172 will now be described.

Block 172 has a depending arm 312 on one side of which there are provided rack teeth 314 which are engaged by teeth 316 on the end of one arm 318 of a bell crank. This bell crank is pivoted at 320 on a pin extending from the casting housing and its other arm 324 has a follower 326 on its end which is engaged by a cam 328 on main power shaft 82. A spring 330 normally biases this arm against the cam, this spring being in surrounding relationship to a rod having a clevis 322 on its end which is pivoted to the arm 324 of the bell crank. The lower end of the rod is suitably supported for limiting swiveling motion in the casting housing. It will be apparent that during each revolution of the cam 328, the bell crank 318, 324 will be swung back and forth through a limited arc about its pivotal axis 320 to raise and lower the block 172 on which the rolls and jaws 32, 34 are mounted. The cam 328, is, of course, contoured to accomplish this raising and lowering of the block 172 at the proper times during the operating cycle as indicated in the timing diagram, FIGURE 18.

Referring again to FIGURES 1–3, it is desirable to provide an auxiliary means for pushing the portion of each wire which extends rightwardly from the conveyer bar along the path of movement of the conveyer bar. This auxiliary pushing means is particularly needed in the case of extremely long leads. Accordingly, a pusher finger 338 is provided which moves beside the conveyer bar to assist in carrying the lead to the gauging station. This finger then is lowered and moves leftwardly to its starting position preparatory to the pushing of the next lead being handled. A description of the mechanism for actuating this pushing finger 338 follows.

Referring particularly to FIGURES 5, 9, 10, and 11, the bundle of wires rests upon a guide bar 334 mounted above the surface 5 on a suitable bracket secured to the housing casting as shown. The pushing arm 336 is disposed below the surface 5 and the pushing finger 338, which actually pushes the wire, extends through a suitable opening in the surface 5. An additional horizontally extending finger 340 extends from the arm 336 beneath the wire being pushed. The arm 336 constitutes one arm of a bell crank which is pivoted at 342 to a slide member 344 in a housing 346 which in turn is mounted in the housing casting walls 3e, 3f. A guide rod 348 extends through, and is secured to, the slide member 344 and through suitable bearing surfaces 350 in housing 346 which guide it along its path of movement rightwardly and leftwardly in FIGURES 10 and 11. Although the slide member 344 must be permitted to move between the positions shown in FIGURES 10 and 11, there should be a certain amount of frictional drag restricting its movement which should be adjustable for best results. This frictional drag is achieved by means of a fiber-washer or block 352 (FIGURE 5) which is mounted on a fixed rod on housing 346 and is resiliently biased by a spring 354 against the guide rod 348. The reason for this frictional drag on the movement of the slide member will become apparent as the description proceeds.

The other arm 356 of the bell crank (of which the arm 336 constitutes a first arm) is pivoted to a link 358, the other end of this link being pivotally connected to one arm 360 of a small bell crank pivoted at 362 to the housing. The remaining arm 366 of this bell crank is in turn pivoted to a relatively short link 368 which in turn is pivotally connected to a rocker arm 370. This rocker arm 370 is pinned to a shaft 372 journaled in a suitable pillow bearing 374 integral with the housing 346. A collar secured to the shaft 372 has a laterally extending arm 376 on the end of which there is provided a roller 380. This roller is adapted to be engaged by a vertically extending control rod 382 (see FIGURE 9) having a clevis 384 on its end. Clevis 384 in turn is pivoted to an additional clevis 386 which in turn straddles the previously identified bell crank arm 318 (FIGURE 13).

It will be apparent that during upward movement of the bell crank arm 318, the control rod 382 is raised thereby causing a slight clockwise movement of the shaft 372 and upward movement of the rocker arm 370. The upward movement of the rocker arm 370 is transmitted through the link 368, the bell crank 366, 360 and link 358 to the depending arm 356 of the bell crank on which the pushing finger 338 is provided. The bell crank 336, 356, swings about its pivotal axis 352 until it engages the stop pin 398 on the slide member 344. Further upward movement of the rocker arm 370 causes rightward sliding movement of slide member 344 causing the pushing finger 338 to move from the position of FIGURE 10 to the position of FIGURE 11.

As previously mentioned, there should be some frictional drag on the slide block 344. This is required in order to insure that the bell crank 336, 356 will swing to the limit of its travel against the pin 398 before rightward movement from the position of FIGURE 10 of the slide block 344 commences.

The parts are resiliently biased to the position of FIGURE 10 by means of a control rod 390 and spring 396. The control rod 390 extends through an ear 378 integral with the boss from which the ear 376 extends and this control rod 390 extends leftwardly as viewed in FIGURE 10 through a wall 392 of the housing 346. The end of the rod 390 is provided with a stop washer 394 and the spring 396 is interposed between the opposed surfaces of this washer and the wall of housing 392. As illustrated in FIGURES 10 and 11, when the arm 370 is raised by the control rod 382, and ear 378 swings through a slight clockwise arc with the shaft 372 and the spring 396 is thereby compressed. When the rod 382 is lowered, the spring is effective to return the shaft 372 to its starting or initial position (FIGURE 10).

Figure 7:
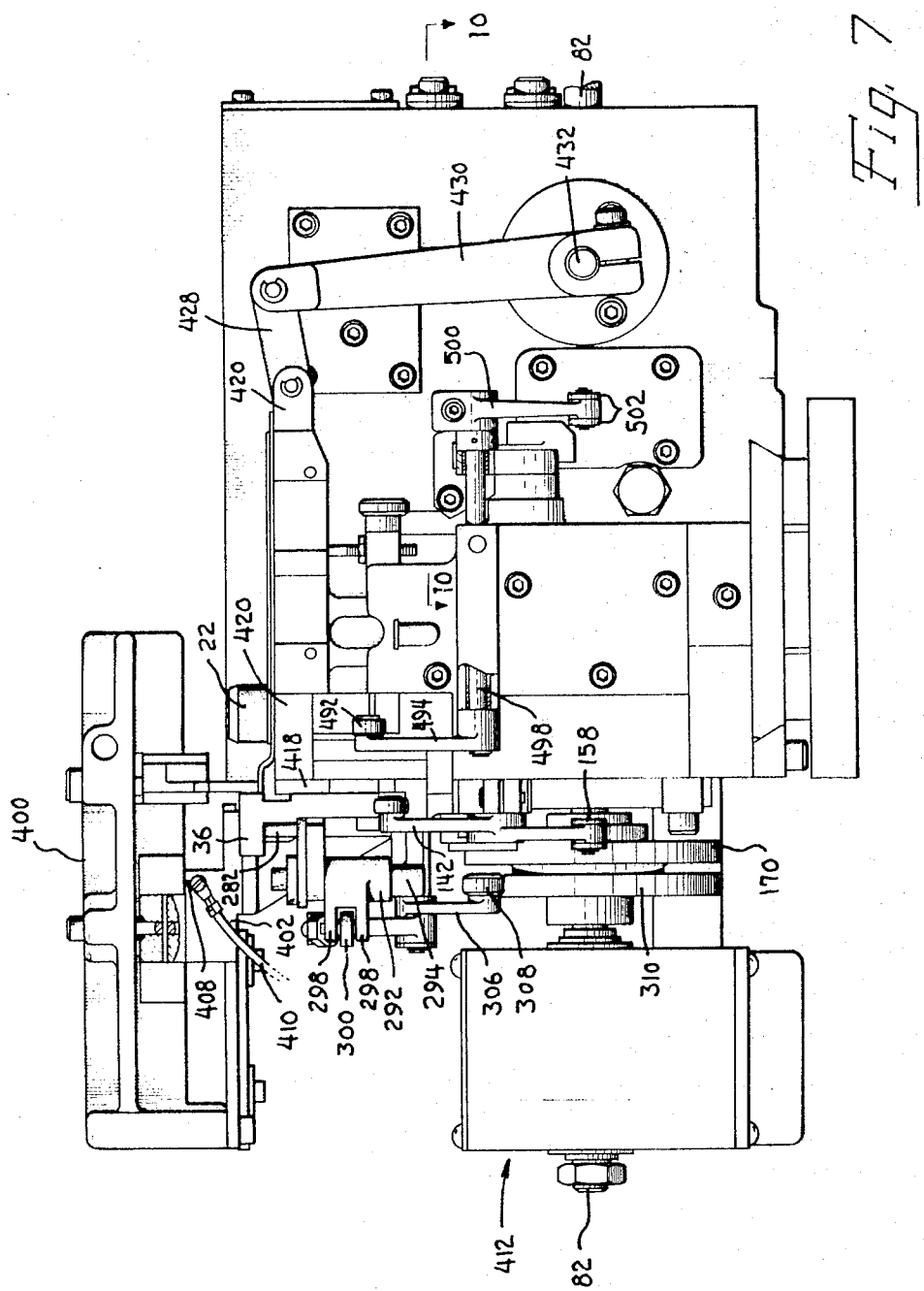

Referring to FIGURES 5, 6, and 7, the previously mentioned wire end sensing filament 408 is mounted in the insulating block 404 and against the arcuate surface 406 over which the straightening member 282 moves. The insulating block 404 extends from a base portion 402 which is mounted on a suitable bracket 400 extending from the housing casting laterally of the path of movement of the conveyor bar. The arrival of the stripped end of the wire at the sensing element 408 energizes the various control circuits which control the solenoids 230 and 256. These control circuits may be in accordance with the general teachings of the co-pending application of Robert Grebe et al. Ser. No. 325,321.

In the disclosed embodiment of the invention, the pulse from the sensing wire 408, which is generated when the stripped end of the lead contacts sensing wire 408, trigger a circuit which energizes solenoid 256 to close the jaws 32, 34. The solenoid 230 may be controlled by a silicon controlled rectifier in a housing 412. A light source in this housing is disposed on one side of a disc 512 on the main power shaft, the silicon controlled rectifier being on the opposite side of the disc. Disc 512 is provided with an opening so that during each revolution of the main power shaft, light will pass through the opening and impinges on a silicon controlled rectifier, which, in turn, causes energization of solenoid 230 thus effecting closure of the rolls as described above.

WIRE INSERTING MECHANISM

Returning again to FIGURES 1–3, after an individual wire has been gauged, it is carried by the jaws 28, 30 on the conveyor means 16, 72, to the inserting jaws 36, 38 which grip the wire and carry it forwardly and downwardly to position its stripped end in the uncrimped terminal on the crimping anvil 42. Referring now to FIGURES 5–7 and 9, the jaws 36, 38 are mounted on spaced-apart pivotal axes 414, 416 comprising pins which extend into the head portion 418 of a slide having a main body portion 420 which extends rearwardly beside the casting housing. The main body of the slide is guided in a guide frame 422 with suitable gibs 421 secured to the frame. The guide frame 422 for the slide member has an integral depending arm 424 on its underside by means of which it is raised and lowered as will be described subsequently.

The horizontal movement of the slide 420 is achieved by means of an oscillating shaft 432 (FIGURE 16) having an arm 430 mounted thereon which is connected by means of a link 428 to the slide 420 at 426. The shaft 432 is journaled in the housing casting wall 3c and is oscillated by means of a lever 434 on its end. One end 436 of this lever bears against a compression spring 438 which biases this end upwardly and out of the plane of the paper as viewed in FIGURE 16. The other end of the lever 434 is bifurcated as shown at 440 and pivotally connected by means of a universal link 442 (which appears in end view in FIGURE 16) to a lever 444. This lever is pivoted at 446 and has a follower 448 one one end thereon which is in engagement with a cam 450 on the main power shaft 82. It will thus be apparent that the cam 450 will have the effect of rocking the lever 434 about its pivotal axis thereby oscillating the shaft 432 and moving the slide member in a horizontal plane towards and away from the crimping press during each operating cycle.

Vertical reciprocation of the slide support 422 and the slide 420 is achieved by rach teeth 452 on the lower end of the depending arm 424 of the slide support. These teeth mesh with teeth 456 of a sector gear on an oscillating shaft 458, see FIGURES 9 and 10. The shaft 458 is suitably journaled in the housing casting and is connected by means of a link 460 at its right hand end in FIGURE 16 to a control rod 466. The link 460 has its upper end extending between, and pivoted to, a clevis on the end of the rod 466. The rod 466 passes through the wall 3c of the housing casting and extends towards the main power shaft. At its end, this control rod is pivotally connected at 468 to one arm 470 of a bell crank. The bell crank in turn is pivotally mounted on a boss 472 extending from an ear 476 integral with the housing casting and has a cam follower 478 mounted on its other arm 474. This cam follower 478 bears against a cam 480 on the main power shaft. The control rod is biased to the position shown in FIGURE 10 by a spring 482 which surrounds a rod extending towards the arm 474. The shaft 458 is thus oscillated against the force of the spring 482 by the cam 480 during each operating cycle.

The jaws 36, 38 are automatically closed when the parts are in the relative positions of FIGURE 2 and, at the same time the jaws 28, 30 are opened. Thereafter the conveyor bar moves leftwardly and the jaws 36, 38 move inwardly and downwardly as described above to position the stripped end of the wire on the uncrimped terminal supported on the anvil. The mechanism for closing these jaws and later opening them will now be described.

The jaws 36, 38 are enlarged in the vicinity of their pivotal axes 414, 416 and a pin 488 fits into semi-circular recesses on the adjacent surfaces of the jaws as described with reference to the jaws 28, 30. In other words, the jaws 36, 38 can be opened or closed by merely swinging the lower end 490 of jaw 36 about its pivotal axis. Jaws 36, 38 are normally resiliently biased to their closed condition by a spring 486 which bears against the lower end 490 of the jaw 36 and which also bears against a depending portion 492 of the head 418 of the slide member. The jaws are momentarily opened while the wire is being located therebetween by means of a lever 494 having a roller 496 on its upper end which moves against the side of the depending portion 490 of the jaw 36 and swings this jaw clockwise about its pivotal axis 414. Lever 494 is mounted on, and secured to, an oscillating shaft 498 (FIGURE 16) which extends rearwardly through suitable bearing means and is pivotally connected at its rearward end to a lever 500 which in turn is connected by a link 502 pivoted at each end, to a control rod 504 extending towards the main power shaft and through wall 3c of the casting housing. This push rod 504 has a cam follower 506 which is engaged by a cam 508 on the main power shaft. The end of rod 504 is enlarged and has a slot through which the main power shaft extends. This arrangement, similar to the arrangement of rod 162, guides the rod 504 along a straight line path. A spring 510 bears against the end of the push rod and against a suitable bearing boss forming part of the housing casting to maintain the cam follower 506 against the surface of the cam 508. It will be apparent that when shaft 498 is rotated through a minor arc by control rod 504, lever 494 will be swung towards the lower end 490 of jaw 36 to open the two jaws.

The operation of the machine can be clearly understood from a study of the timing diagram, FIGURE 18, taken in conjunction with the foregoing description of the manner in which these movements are achieved. Generally, the conveyer bar moves along a rectangular path. The location of the notch in the conveyer bar is indicated by the letters A, B, C, D in the upper row of the timing diagram and the legends in the succeeding rows explain the motions and activities of the various elements while the notch is in the positions indicated. It will be noted that dwells occur when the notch is in positions A, B, and D to permit, in position B, the rolls to close and commence pulling the wires and, in position D, the grippers or jaws 28, 30 which are mounted on the notch bar to be opened so that they will move upwardly into straddling relationship with the wire identified as 14 in FIGURE 1 which has been gauged. The cams mounted on the main power shaft will, of course, be timed and positioned such that the operations will take place in the desired sequence.

A significant advantage of a machine in accordance with the invention is that the conveyer is in motion during much of the operating cycle so that a relatively high production rate can be achieved. However, the rather complicated gauging and crimping operations and the operation of carrying the previously gauged wire to the crimping press need not be completed in the short dwell periods when the notch bar is at any of the stations A-B noted above. These operations are rather carried out while the notch bar is moving between stations B, C, and D. Thus, a relatively long time interval is provided for these gauging, inserting, and crimping operations not withstanding the relatively high overall production rates achieved.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. A lead making machine for applying terminals to wire ends comprising, wire holding means for holding a bundle of wires in a horizontal attitude, conveyer means for conveying said wires one at a time from said bundle to a crimping station disposed beside wire holding means, said conveyer means being movable along a generally rectangular path having a first component extending from said holding means towards said crimping station, a second component extending laterally away from said holding means, a third component extending from said crimping station towards said holding means, and a forth component extending laterally towards said holding means, said conveyer means having a notch on its upper side whereby one of said wires enters said notch during movement of said conveyer along said first component and is carried towards said crimping station, stationary means beside said first component of said path for retaining said bundle against movement during movement of said conveyer along said first component, a wire positioning station on said first component of said path between said wire holding means and said crimping station, said positioning station comprising a first closable gripping means, wire pulling means, and wire end detecting means, means for actuating said pulling means to pull a wire in said notch transversely of said conveyer until the end of said wire is located at a predetermined distance from said conveyer means, means responsive to said wire end detecting means for closing said first closable gripping means after conclusion of pulling of said wire, a second closable gripping on said conveyor means on the end thereof which is proximate to said crimping station, means for closing said second closable gripping means and opening said first closable gripping means at the beginning of movement of said conveyor means along said first component of said path whereby, a gripped wire is carried to a location adjacent to said crimping station, slide means movable transversely of said first component and towards said crimping station, third closable gripping means on said slide means, means for closing said third gripping means at the conclusion of movement of said conveyer menas along said first component and for moving said slide means towards said crimping means whereby, said wire is gripped in said third gripping means and carried to said crimping means, said first, second, and third gripping means maintaining accurate control of said wire to position the end of said wire precisely in a terminal in said crimping means.

2. Apparatus as set forth in claim 1 wherein said conveyer means comprises an elongated bar, said notch being intermediate the ends of said bar and said second closable gripping means comprising gripping jaws on said bar.

3. Apparatus as set forth in claim 1 including means for moving said wire pulling means and said first closable gripping means laterally away from said conveyer during movement of said conveyer along said first component, and for moving said pulling means and said first closable gripping means laterally towards said conveyer at the beginning of movement of said conveyer along said second component whereby a wire delivered to said pulling station is pulled laterally of said conveyer during movement of said conveyer along said second component.

4. In a lead making machine of the type comprising a conveyor, a wire loading station, a wire locating station, and a wire crimping station beside said conveyor, said conveyer being adapted to hold a wire intermediate its ends and transport said wire along a path extending from said loading station to said crimping station, the improvement comprising: means on said conveyer for releasing each wire conveyed at said locating station and wire locating means at said locating station for moving said wire laterally until a predetermined length of wire extends laterally from said conveyer, and means on said conveyer for grasping a located wire whereby said located wire is transported to said crimping station and a further wire is delivered to said locating station, said wire locating means being operable during movement of said conveyer between said stations.

5. A lead making machine comprising, a conveyer, a wire loading station, a wire locating station, and a crimping station, said stations being located beside said conveyer, said conveyer being movable along a forward stroke extending towards said crimping station and being movable along a return stroke towards said loading station, said conveyer having notch means thereon movable from said loading station to said locating station during said forward stroke and having conveyer closable gripping means thereon movable from said locating station to said crimping station during said forward stroke, a wire moving means at said locating station for moving a wire axially until an end of said wire is located at a predetermined distance from said conveyer, means at said loading station for positioning a wire in said notch during said forward stroke, means for closing said conveyer closable gripping means at the beginning of said forward stroke, and means for actuating said moving means during movement of said conveyer along said return stroke whereby, during each cycle of operation, a previously located wire is carried from said locating station to said crimping station, and a next wire is delivered to said locating station during said forward stroke, and said next wire is moved and located at said locating station.

6. A machine as set forth in claim 5 including a crimping press and wire inserting means at said crimping station, said inserting means comprising slide means movable transversely of the path of movement of said conveyer towards said crimping press, said inserting means having inserter closable gripping means thereon for carrying said wire towards said press, and means for closing said inserter closable gripping means and opening said conveyer closable gripping means upon delivery of a located wire to said crimping station.

References Cited

UNITED STATES PATENTS

| | | | |
|---|---|---|---|
| 2,876,452 | 3/1959 | Herman et al | 72—421 |
| 3,135,310 | 6/1964 | Stolz | 72—397 |
| 3,204,334 | 9/1965 | Long et al. | 29—230 X |
| 3,264,860 | 8/1966 | Herb | 72—457 |
| 3,267,556 | 8/1966 | Scharf | 29—630 |

THOMAS H. EAGER, Primary Examiner

U.S. Cl. X.R.

29—630; 72—421, 457